United States Patent
Higuchi

(10) Patent No.: US 8,049,907 B2
(45) Date of Patent: Nov. 1, 2011

(54) DATA PROCESSING APPARATUS, DATA PROCESSING SYSTEM, METHOD FOR CONTROLLING DATA PROCESSING APPARATUS, METHOD FOR ADDING DATA CONVERTING FUNCTION, PROGRAM AND MEDIUM

(75) Inventor: Hiroshi Higuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1195 days.

(21) Appl. No.: 11/328,665

(22) Filed: Jan. 10, 2006

(65) Prior Publication Data

US 2006/0221368 A1 Oct. 5, 2006

(30) Foreign Application Priority Data

Mar. 31, 2005 (JP) .................................. 2005-105315
Nov. 9, 2005 (JP) .................................. 2005-324396

(51) Int. Cl.
*G06F 3/12* (2006.01)
(52) U.S. Cl. ...................................... 358/1.13; 358/1.15
(58) Field of Classification Search .................... None
See application file for complete search history.

(56) References Cited

U.S. PATENT DOCUMENTS 7,096,310 B2 * 8/2006 Norden .......................... 710/317
7,474,431 B2 * 1/2009 Yamano et al. ............... 358/1.15
2004/0167974 A1 8/2004 Bunn et al.

FOREIGN PATENT DOCUMENTS

| JP | 6-131338 | 5/1994 |
| JP | 9-116666 | 5/1997 |
| JP | 2000-309142 | 11/2000 |
| JP | 2001-318772 | 11/2001 |
| JP | 2004-252984 | 9/2004 |

OTHER PUBLICATIONS

Dec. 7, 2010 Japanese official action in connection with counterpart Japanese patent application.

* cited by examiner

*Primary Examiner* — Mark K Zimmerman
*Assistant Examiner* — Marcus T Riley
(74) *Attorney, Agent, or Firm* — Cooper & Dunham LLP

(57) ABSTRACT

A data processing apparatus is monitoring the first port of itself and the second port of itself. If the data processing apparatus receives data via the second port, it conducts a specific process to the data regardless of a data format of the data so as to convert the data into the data format that can be processed regardless of a data format of the data and sends converted data to the first port.

30 Claims, 17 Drawing Sheets

FIG. 6
DATA RECEIVED VIA PORT 9200
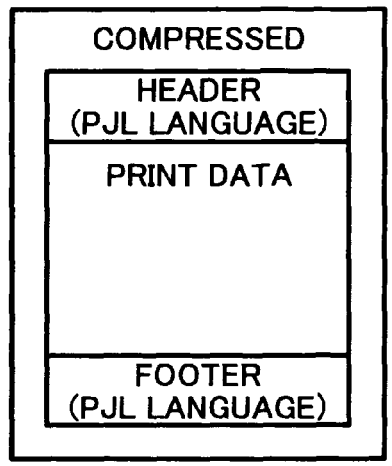
DATA SENT TO PORT 9100
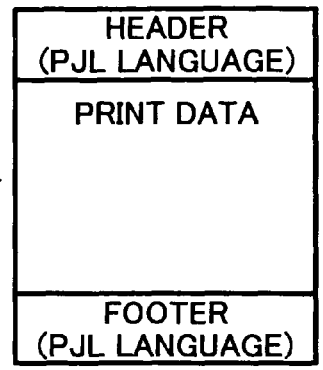
DECOMPRESSION
FIG. 7
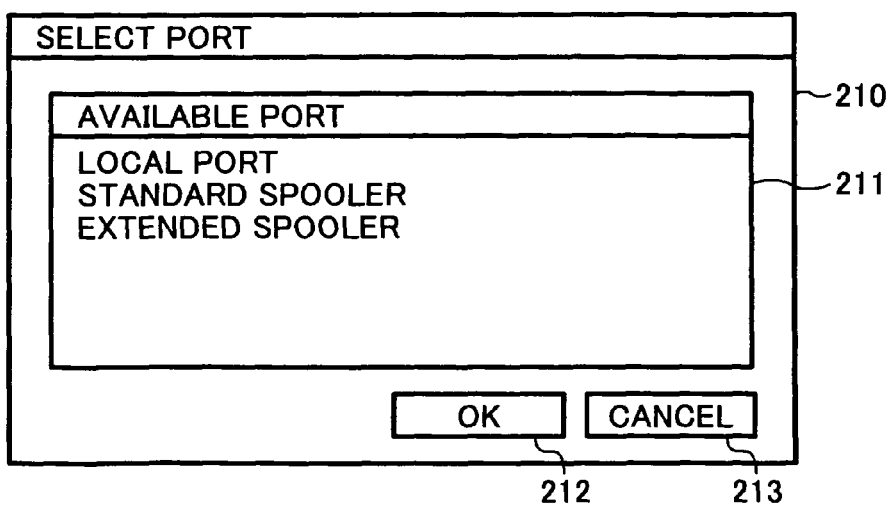

FIG. 9

SELECT PROTOCOL
- ● TCP/IP
- ○ IPP 220, 221, 222

[SEARCH]

223

| PRINTER MODEL | PRINTER ID | ADDRESS |
|---|---|---|
| Printer_A | PRN123456 | 133. 139. 231. xxx |
| Printer_A | PRN123457 | 133. 139. 231. xxy |
| Printer_B  224 | PRN223456 | 133. 139. 231. yyy |
| Printer_B | PRN223457 | 133. 139. 231. yyz |
| MFP_X | PRN654321 | 133. 139. 231. zzz |

☑ COMPRESS PRINT DATA  226   227

225    [OK]   [CANCEL]

FIG. 10

REGISTERED PRINTER LIST

| NAME | STATUS |
|---|---|
| ADD PRINTER | |
| Printer_A | READY |
| ▶ Printer_A No. 2 (COMPRESS) | READY |
| Printer_B | READY |
| Printer_B No. 2 | READY |

EXTENDED SPOOLER — 231

DESTINATION PORT
PORT NO.: [ 9200 ] — 232

230

TIME OUT [ 5 ] MIN.
233

☑ COMPRESS PRINT DATA

| FIG. 15A | FIG. 15B | FIG. 15C |

| DRIVER | Ver | SPEED | COMPRESSED/ NON-COMPRESSED | DATA IN | |
|---|---|---|---|---|---|
| PCL6 | Ver.1.2.0.0 | 64k | COMPRESSED | 00:08.11 | 202% |
| | | 64k | NON-COMPRESSED | 00:04.02 | |
| | | 128k | COMPRESSED | 00:03.86 | 93% |
| | | 128k | NON-COMPRESSED | 00:04.17 | |
| | | 448k | COMPRESSED | 00:04.11 | 117% |
| | | 448k | NON-COMPRESSED | 00:03.52 | |
| | | 1344k | COMPRESSED | 00:03.40 | 107% |
| | | 1344k | NON-COMPRESSED | 00:03.17 | |
| PCL5e | Ver.1.2.0.0 | 64k | COMPRESSED | 00:04.59 | 109% |
| | | 64k | NON-COMPRESSED | 00:04.22 | |
| | | 128k | COMPRESSED | 00:04.11 | 90% |
| | | 128k | NON-COMPRESSED | 00:04.58 | |
| | | 448k | COMPRESSED | 00:04.77 | 128% |
| | | 448k | NON-COMPRESSED | 00:03.74 | |
| | | 1344k | COMPRESSED | 00:04.02 | 108% |
| | | 1344k | NON-COMPRESSED | 00:03.71 | |
| RPCS | Ver.4.19 | 64k | COMPRESSED | 00:08.24 | 106% |
| | | 64k | NON-COMPRESSED | 00:07.77 | |
| | | 128k | COMPRESSED | 00:06.70 | 103% |
| | | 128k | NON-COMPRESSED | 00:06.49 | |
| | | 448k | COMPRESSED | 00:05.96 | 102% |
| | | 448k | NON-COMPRESSED | 00:05.83 | |
| | | 1344k | COMPRESSED | 00:06.11 | 112% |
| | | 1344k | NON-COMPRESSED | 00:05.46 | |

FIG. 15B

| J9 (WORD 5 PAGES) || J10 (EXCEL 5 PAGES) |||
|---|---|---|---|
| FIRST PAGE EJECTED | COMPLETION OF PRINT | DATA IN | FIRST PAGE EJECTED |
| 01:01.52 <br> 01:58.52  52% | 02:19.80 <br> 04:46.46  49% | 00:04.33 <br> 00:03.68  118% | 00:18.77 <br> 00:40.84  46% |
| 00:34.55 <br> 01:04.80  53% | 01:13.08 <br> 02:27.77  49% | 00:03.58 <br> 00:03.62  99% | 00:13.08 <br> 00:23.02  57% |
| 00:16.64 <br> 00:24.58  68% | 00:30.61 <br> 00:47.77  64% | 00:04.02 <br> 00:03.52  114% | 00:11.11 <br> 00:12.30  90% |
| 00:13.55 <br> 00:13.55  100% | 00:24.90 <br> 00:24.08  103% | 00:03.46 <br> 00:02.99  116% | 00:12.05 <br> 00:11.46  105% |
| 00:32.46 <br> 00:53.49  61% | 01:32.12 <br> 03:19.18  46% | 00:05.36 <br> 00:04.92  109% | 00:16.36 <br> 00:26.23  62% |
| 00:19.83 <br> 00:31.71  63% | 00:51.11 <br> 01:42.77  50% | 00:03.74 <br> 00:03.52  106% | 00:11.68 <br> 00:16.39  71% |
| 00:14.96 <br> 00:14.93  100% | 00:28.33 <br> 00:35.21  80% | 00:03.64 <br> 00:04.00  91% | 00:11.67 <br> 00:11.17  104% |
| 00:14.30 <br> 00:11.33  126% | 00:27.65 <br> 00:23.46  118% | 00:03.80 <br> 00:03.20  119% | 00:12.77 <br> 00:09.95  128% |
| 01:01.49 <br> 01:34.09  65% | 02:57.56 <br> 04:52.12  61% | 00:07.99 <br> 00:09.52  84% | 00:22.22 <br> 00:24.58  90% |
| 00:36.55 <br> 00:53.27  69% | 01:33.89 <br> 02:30.34  62% | 00:05.43 <br> 00:06.30  86% | 00:13.90 <br> 00:16.11  86% |
| 00:18.55 <br> 00:22.52  82% | 00:34.52 <br> 00:50.02  69% | 00:05.77 <br> 00:05.71  101% | 00:12.80 <br> 00:12.90  99% |
| 00:13.67 <br> 00:14.05  97% | 00:24.20 <br> 00:24.74  98% | 00:05.58 <br> 00:04.74  118% | 00:13.21 <br> 00:12.64  105% |

FIG. 15C

| | J11 (POWERPOINT 12 PAGES) | | | | | | |
|---|---|---|---|---|---|---|---|
| COMPLETION OF PRINT | | DATA IN | | FIRST PAGE EJECTED | | COMPLETION OF PRINT | |
| 03:32.05 | 57% | 00:06.43 | 119% | 00:24.99 | 51% | 04:36.80 | 66% |
| 06:11.27 | | 00:05.39 | | 00:49.36 | | 07:02.36 | |
| 01:52.25 | 59% | 00:05.21 | 111% | 00:16.77 | 58% | 02:23.36 | 66% |
| 03:10.15 | | 00:04.68 | | 00:29.15 | | 03:36.77 | |
| 00:47.96 | 76% | 00:04.80 | 105% | 00:12.70 | 86% | 00:52.92 | 77% |
| 01:03.11 | | 00:04.56 | | 00:14.77 | | 01:08.75 | |
| 00:36.36 | 103% | 00:04.55 | 101% | 00:12.27 | 94% | 00:41.92 | 99% |
| 00:35.15 | | 00:04.52 | | 00:12.99 | | 00:42.30 | |
| 02:17.83 | 34% | 00:06.65 | 110% | 00:24.49 | 64% | 03:01.74 | 49% |
| 06:40.70 | | 00:06.02 | | 00:38.05 | | 06:14.45 | |
| 01:22.68 | 40% | 00:06.49 | 122% | 00:17.37 | 75% | 01:35.12 | 49% |
| 03:26.49 | | 00:05.33 | | 00:23.08 | | 03:12.70 | |
| 00:53.64 | 78% | 00:05.30 | 92% | 00:12.99 | 94% | 00:45.89 | 74% |
| 01:08.86 | | 00:05.77 | | 00:13.86 | | 01:01.95 | |
| 00:51.18 | 102% | 00:05.30 | 104% | 00:12.99 | 97% | 00:42.02 | 100% |
| 00:50.33 | | 00:05.08 | | 00:13.39 | | 00:42.20 | |
| 03:33.71 | 61% | 00:07.99 | 98% | 00:23.86 | 81% | 04:56.42 | 70% |
| 05:49.71 | | 00:08.14 | | 00:29.39 | | 07:04.30 | |
| 01:53.09 | 63% | 00:07.49 | 140% | 00:20.06 | 106% | 02:35.21 | 71% |
| 02:59.49 | | 00:05.36 | | 00:18.86 | | 03:38.17 | |
| 00:44.27 | 72% | 00:06.58 | 77% | 00:13.46 | 96% | 00:51.71 | 73% |
| 01:01.09 | | 00:08.55 | | 00:14.08 | | 01:10.42 | |
| 00:28.77 | 91% | 00:06.68 | 108% | 00:13.84 | 115% | 00:42.68 | 104% |
| 00:31.55 | | 00:06.21 | | 00:11.99 | | 00:40.90 | |

FIG. 16

DRIVER: PCL6

| | DOCUMENT TYPE | | SPOOLED DATA | NON-COMPRESSED | COMPRESSED | COMPRESSION RATE |
|---|---|---|---|---|---|---|
| J9 | WORD | 2,401 DOCUMENT | 1.91MB | 1,957 | 927 | 47% |
| J10 | EXCEL | 1,030 3P | 1.89MB | 1,942 | 1,215 | 63% |
| | | 2P | 0.64MB | 641 | 224 | 35% |
| J11 | POWERPOINT | 3,702 SLIDE | 2.90MB | 2,972 | 1,907 | 64% |

DRIVER: PCL5e

| | DOCUMENT TYPE | | SPOOLED DATA | NON-COMPRESSED | COMPRESSED | COMPRESSION RATE |
|---|---|---|---|---|---|---|
| J9 | WORD | 2,401 DOCUMENT | 1.33MB | 1,372 | 600 | 44% |
| J10 | EXCEL | 1,030 3P | 1.37MB | 1,414 | 617 | 44% |
| | | 2P | 1.33MB | 1,369 | 262 | 19% |
| J11 | POWERPOINT | 3,702 SLIDE | 2.53MB | 2,597 | 1,229 | 47% |

DRIVER: RPCS

| | DOCUMENT TYPE | | SPOOLED DATA | NON-COMPRESSED | COMPRESSED | COMPRESSION RATE |
|---|---|---|---|---|---|---|
| J9 | WORD | 2,401 DOCUMENT | 1.92MB | 1,972 | 1,199 | 61% |
| J10 | EXCEL | 1,030 3P | 1.97MB | 2,026 | 1,251 | 62% |
| | | 2P | 0.37MB | 374 | 171 | 46% |
| J11 | POWERPOINT | 3,702 SLIDE | 2.92MB | 2,994 | 2,047 | 68% |

FIG. 17
DATA RECEIVED VIA PORT 9200
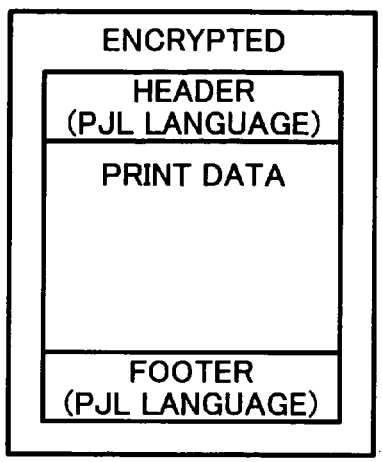
DECRYPTION →
DATA SENT TO PORT 9100
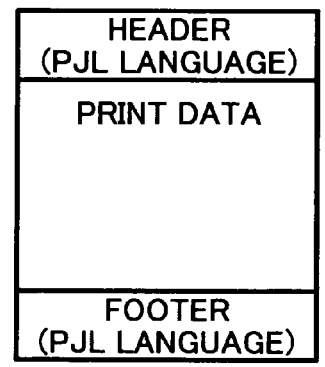
FIG. 18
DATA RECEIVED VIA PORT 9200
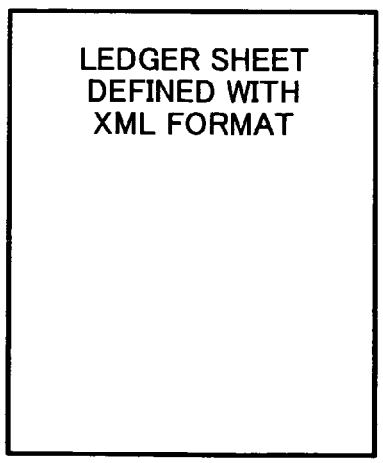
DATA CONVERTING →
PRINTER DRIVER'S FUNCTION
DATA SENT TO PORT 9100
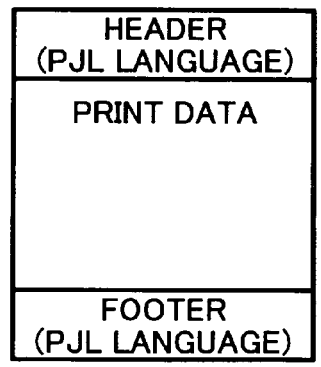

DATA PROCESSING APPARATUS, DATA PROCESSING SYSTEM, METHOD FOR CONTROLLING DATA PROCESSING APPARATUS, METHOD FOR ADDING DATA CONVERTING FUNCTION, PROGRAM AND MEDIUM

BACKGROUND

1. Field

This disclosure generally relates to a data processing apparatus, a data processing system, a method for controlling data processing apparatus, a method for adding a data converting function, program and medium.

2. Description of the Related Art

A data processing apparatus that listens to (monitors) a specific port and processes data received via the port regardless of a data format has been proposed.

A printer that prints based on print data received from, for example, a PC (personal computer) is an example of such a data processing apparatus.

FIG. 21 is a functional block diagram showing a configuration of such a PC and a printer.

As shown in this diagram, a PC 80 is generally provided with an application 81 such as a word processor program, a spreadsheet program and a drawing program, so as to realize various functions. And a user gives a print instruction to the application 81 to print documents, diagrams or a like handled by the application 81.

Additionally, the PC 80 is provided with a printer driver 82 that converts data output by the application 81 into print data in a data format of a printer language that can be processed by a printer 90. When a user gives a print instruction, the application 81 sends data to be printed to the printer driver 82 corresponding to the printer designated by a user, and the printer driver.82 converts the data into the print data in the format that can be processed by the designated printer and spools the data in a spool directory of a port monitor 83.

The port monitor 83 is a driver that transmits data between the PC 80 and the printer 90. The port monitor 83 sends data spooled in the spool directory to the port 9100 in the printer to be used. This port is used by the printer 90 to receive print data and determined according to a protocol used by the printer 90.

On the other hand, the printer 90 is provided with a printer engine 93 that is an engine part to perform actual printing and a printer application 91.

The printer application 91 lists to the port 9100 while the printer application 91 is active. When the printer application 91 receives data via this port, the printer application 91 converts the data into image data so that the printer engine 93 can print, on the assumption that the data are print data in the specific printer language. This process is, for example, a process that generates image data in the format of bitmap data by conducting a generating process in a image memory based on print data. While driven based on the image data, the printer engine 93 can form an image corresponding to the print data on paper.

In this case, in view of efficiency of development and reduction of processing load, the printer application 91 does not check a data format of received data and conducts the same process to any received data. This is not a problem for an operation of the printer 90, if a PC side, as a data source, always sends data in the format that can be processed by the printer application 91.

Such a printer is described, for example, in Japanese Laid-Open Application 2004-252984 (paragraph 0061).

However, like the printer 90 described above, in the case a data receiver can only process data in the specific format, a data sender must send data in the same format. Accordingly, it is impossible to improve transmission speed by compressing data to be sent so as to reduce data volume or to improve security level by encrypting data.

In order to solve this problem, a technology wherein a data receiver decides a format of received data and conducts a process according to a result of the determination may be applied. However, this brings more processing load and imposes more burden to develop because of modifying the existing printer application needs to be modified thoroughly.

Such a problem exists not only in the printer 90 described above but also in data processing apparatuses that process data regardless of a data format of received data.

SUMMARY

This disclosure provides data processing apparatuses, data processing systems, methods for controlling data processing apparatus, methods for adding a data converting function, program and medium, in which some or all of the above-mentioned problems are eliminated.

This disclosure provides an information processing apparatus, a method for adding image processing functions, and a program that adds data converting functions (and medium embodying the program), in which it is possible for a data processing apparatus to process data in a plurality of data formats in light processing load regardless of a data format received first. Another more specific object of the present invention is to provide an information processing apparatus, a method for adding data converting functions, and a program that adds data converting functions and medium, in which it is possible to develop devices with such functions easily in making use of existing resources.

For example, this disclosure provides a data processing apparatus including: a data processing part for monitoring a first port of the data processing apparatus and conducting a first specific process to first data received via the first port regardless of a first data format of the first data; and a data converting part for monitoring a second port that is different from said first port; conducting a second specific process to second data received via said second port regardless of a second data format of the second data so as to convert the second data into the first data format which can be processed by said data processing part and sending converted data to said first port.

The first data preferably indicates that it is to be sent to the first port, and the second data preferably indicates that it is to be sent to the second port.

Moreover, the data processing apparatus may further include a plurality of converting parts for monitoring each specific port that is different from said first port, by each converting part conducting a plurality of specific processes to data received via the specific port regardless of a data format of the received data so as to convert the data into the first data format that can be processed by said data processing part and sending converted data to said first port.

Furthermore, the data processing apparatus may include a transiting part for setting the data processing apparatus into a power saving mode; and a recovering part for resetting the data processing apparatus from the power saving mode to a normal operation mode when receiving data via said first port.

In the data processing apparatus, the process conducted by the data processing part may be converting data in a printer language to image data to be printed by a printer engine.

Moreover, in the data processing apparatus, the process conducted by the data processing part may include one of data decompression, decryption or printer language converting.

The disclosure also provides a data processing system, including: a data processing apparatus capable of processing data received from an information processing apparatus, the data processing apparatus including a data processing part for monitoring a first port and conducting a specific process to data received via the first port regardless of a data format of the received data, and a data converting part for monitoring a second port which is different from said first port, conducting a specific process to data received via said second port regardless of a data format of the received data so as to convert the data into the data format that can be processed by said data processing part and sending converted data to said first port; and an information processing apparatus including a sending part for sending data in the format that can be processed by said data processing apparatus to said first port and sending data in a format that cannot be processed by said data processing apparatus to said second port.

Moreover, the data processing system may further include a plurality of converting parts for monitoring each port that is different from said first port, each converting part conducting a plurality of specific processes to data received via the specific port regardless of a data format of the data so as to convert the data into the data format that can be processed by said data processing part and sending converted data to said first port.

Moreover, the data processing system may further include a transiting part for setting the data processing apparatus to a power saving mode, a recovering part for resetting the apparatus from the power saving mode to a normal operation mode when receiving data via said first port, and sending dummy data part for sending dummy data to said first port before sending data to said second port in case of sending data to said second port.

In the system, the process conducted by the data processing part may convert data in a printer language to image data to be printed by a printer engine.

Moreover, in the system, the process conducted by the data processing part may include one of data decompression, decryption or printer language converting.

Furthermore, the disclosure provides a method for controlling a data processing apparatus, said method including the steps of: a data processing step comprising: monitoring a first port, conducting a specific process to data received via the first port regardless of a data format of the data; and a data converting step comprising monitoring a second port which is different from said first port, conducting a specific process to data received via said second port regardless of a data format of the data so as to convert the data into the data format that can be processed by said data processing part, and sending converted data to said first port.

Moreover, the method may further include a plurality of converting steps for monitoring each specific port that is different from said first port, by each converting step conducting a plurality of specific processes to data received via the specific port regardless of a data format of the data so as to convert the data into the data format that can be processed by said data processing step and sending converted data to said first port.

Furthermore, the method may further include setting the data processing apparatus to a power saving mode, and resetting the apparatus from the power saving mode to a normal operation mode when receiving data via said first port.

In the method, the process conducted by the data processing part may convert data in a printer language to image data to be printed by a printer engine.

Moreover, in the method, the process conducted by the data processing part may include one of data decompression, decryption or printer language converting.

Furthermore, the disclosure provides a program of instructions executable by a computer to control a data processing apparatus, said program comprising: data processing codes for monitoring a first port, conducting a specific process to data received via the first port regardless of a data format of the data; and data converting codes for monitoring a second port which is different from said first port, conducting a specific process to data received via said second port regardless of a data format of the data so as to convert the data into the data format that can be processed by said data processing part, and sending converted data to said first port.

Moreover, the program may further include a plurality of converting codes for monitoring each specific port that is different from said first port, each converting code conducting a plurality of specific processes to data received via the specific port regardless of a data format of the data so as to convert the data into the data format that can be processed by said data processing code and sending converted data to said first port.

Furthermore, the program may further include the code for setting the data processing apparatus into a power saving mode, and resetting the apparatus from the power saving mode to a normal operation mode when receiving data via said first port.

In the program, the process conducted by the data processing part may convert data in a printer language to image data to be printed by a printer engine.

Moreover, in the program, the process conducted by the data processing part may include one of data decompression, decryption or printer language converting.

Furthermore, the disclosure provides a computer-readable recording medium embodying the program.

BRIEF DESCRIPTION OF THE DRAWINGS

FIG. 6 is a diagram showing a format of data in the system shown in FIG. 5;

FIG. 7 is a diagram showing an example of a registered printer list screen displayed in the PC shown in FIG. 5;

FIG. 8 is a diagram showing an example of a port select screen displayed in the PC shown in FIG. 5;

FIG. 9 is a diagram showing an example of a setting screen of a usage of the extended spooler and a compression of print data in the PC shown in FIG. 5;

FIG. 10 is a diagram showing an example of a registered printer list screen where a printer displayed at the point of the cursor in FIG. 9 is added from a state shown in FIG. 7;

FIG. 11 is a diagram showing an example of a screen for referring to a status of a port for printing also in the PC shown in FIG. 5;

FIG. 15 is a diagram showing a result of an experiment conducted to confirm an effect of the system shown in FIG. 5;

FIG. 16 is a diagram showing another part of the result of the experiment;

FIG. 17 is a diagram corresponding to FIG. 6, showing an example of a format of data in a modification of the second embodiment;

FIG. 18 is a diagram showing another example of a format of data in a modification of the second embodiment;

DESCRIPTION OF THE PREFERRED EMBODIMENT

In the following, an embodiment of the present invention will be described with reference to the accompanying drawings.

In describing embodiments, specific terminology is employed for the sake of clarity. However, the disclosure of this patent specification is not intended to be limited to the specific terminology, so selected and it is to be understood that each specific element includes all technical equivalents that operate in a similar manner.

First Embodiment: from FIG. 1 to FIG. 4

Figure 1:
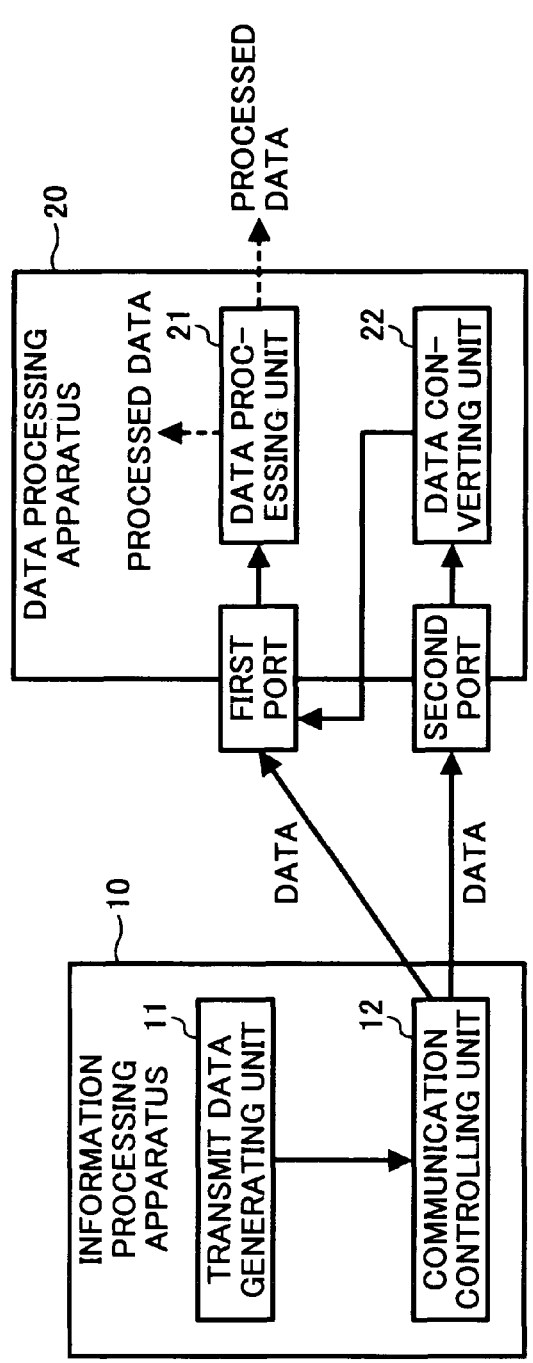
FIG. 1 is a functional block diagram showing a configuration of a data processing system according to a first embodiment.

First, FIG. 1 is a functional block diagram showing a configuration of a data processing system according to a first embodiment.

The data processing system of FIG. 1 includes an information processing apparatus 10 and a data processing apparatus 20, which can communicate mutually via a communication line such as a network including a LAN (local area network). Data can be sent through this communication line from an information processing apparatus 10 to a data processing apparatus 20. However, communication through the communication line in the opposite direction is not necessary.

The data processing apparatus 20 includes a data processing unit 21 and a data converting unit 22. The data processing unit 21 is a data processing part of the apparatus 20. The data processing unit 21 monitors a first port of the apparatus 20 and conducts specific processes to data received via the first port regardless of the data format. On the other hand, the data converting unit 22 is a data converting part of the apparatus 20. The data converting unit monitors a second port of the apparatus 20 which is different from the first port and conducts specific data conversion to the data received via the second port. The data converting unit 22 converts the data into the data format that the data processing unit 21 can handle and sends the converted data to the first port by a loopback. That is, the data converting unit sends converted data to the first port of the address corresponding to itself.

Additionally, the data processed by the data processing unit 21 may be output or used in the data processing apparatus 20 for another purpose. And as concrete examples of data processing, converting a data format, storing data, interpreting data and a like are possible.

Moreover, "regardless of the data format" here means the format at the level of an application identifying data as a processing object. For example, when apparatuses transmit data, according to a communication protocol, a header in a predetermined format is added to a data packet. Therefore, a portion of the data entering a port is required to be in a specific format. This part of the data is not considered, however, at the application level.

On the other hand, the information processing apparatus 10 includes a transmit data generating unit 11 and a communication controlling unit 12. The transmit data generating unit 11 is provided with a function to generate data which is sent to the data processing unit 21 so as to be processed. The communication controlling unit 12 is provided with a function to send data generated by the data generating unit 11 to the first or second port of the data processing apparatus 20. Additionally, address information such as an address of the data processing apparatus 20 is preliminarily configured to be referred to by the communication controlling unit 12.

Moreover, the communication controlling unit 12 is provided with a function to determine whether it sends data to the first or second port of the data processing apparatus 20 according to a format of the data to be sent to the apparatus 20. In other words, both the data processing unit 21 and the data converting unit 22 in the data processing apparatus 20 conduct specific processes (including converting) regardless of the data format of the received data. Therefore, if the data processing apparatus 20 receives the data in the data format not expected as a processing object, the data is not properly processed and output of the process is meaningless data. Accordingly, the information processing apparatus 10 sends data addressed to the appropriate port corresponding to the format.

Therefore, when the data generating unit 11 generates data in the format expected as a processing object by the data processing unit 21, the communication controlling unit 12 sends this data to the first port. And when the data generating unit 11 generates data in the other formats, the communication controlling unit 12 sends this data to the second port.

Therefore, as for both formats, data processed by the data processing apparatus 20 (and ultimately by the data processing unit 21) can be obtained.

In other words, the transmit data sent by the information processing apparatus 10 to the first port of the data processing apparatus 20 are processed directly by the data processing unit 21 and output. On the other hand, the transmit data sent by the information processing apparatus 10 to the second port of the data processing apparatus 20 are, first, converted by the data converting unit 22 into the data format that can be processed by the data processing unit 21, and next processed by the data processing unit 21 and output.

Additionally, in the case the data format of the generated data is not expected for both the data processing unit. 21 and data converting unit 22, transmission may be cancelled by the information processing apparatus 10 side.

Figure 2:
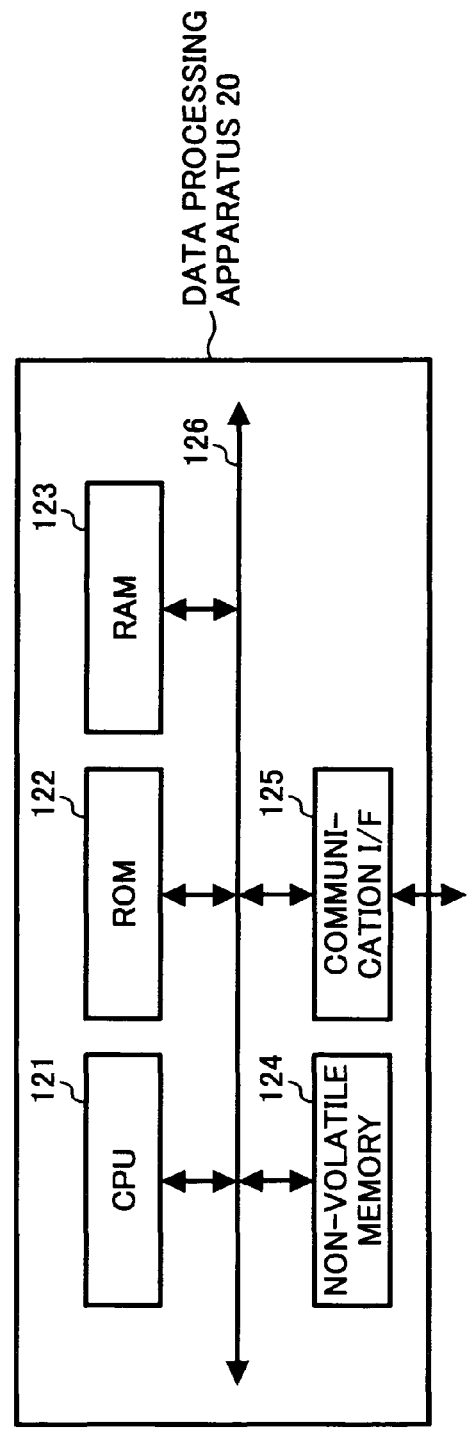
FIG. 2 is a diagram showing a hardware configuration of a data processing apparatus shown in FIG. 1.

Next, FIG. 2 shows hardware configuration of the data processing apparatus 20 described above.

As shown in this diagram, the data processing apparatus 20 includes a CPU (central processing unit) 121, a ROM (read only memory) 122, a RAM (random access memory) 123, an NVRAM (non-volatile RAM) 124 and a communication I/F (interface) 125, which are mutually connected via system bus 126.

The CPU 121 is a controlling part that controls the data processing apparatus 20 and, by executing programs stored in the ROM 122 or the NVRAM 124, functions as a data processing part, a data converting part and a like.

The ROM 122 is a non-volatile storage part and stores programs to be executed by the CPU 121, static parameters or a like. The ROM 122 may be a rewritable storage part so that data stored therein can be updated.

The RAM 123 is a storage part for storing temporary data or functions as a working memory for the CPU 11.

The NVRAM 124 is a rewritable non-volatile storage part, such as a flash memory or a HDD (hard disc drive), and stores programs executed by the CPU 121 or parameters that are required to be stored after the apparatus is turned off.

The communication interface 125 is an interface to connect the data processing apparatus 20 to a network and may be, for example, an interface for communication via ETHERNET. When the data processing apparatus 20 communicates with other apparatuses via the network, this communication interface 125 and the CPU 121 function as a communicating part. In addition, the communication interface 125 can be selected according to the interface standards of the apparatus, the protocols of the apparatus or a like. Furthermore, of course, the communication interface 125 can be applied to a plurality of interface standards or protocols.

In addition, although not shown in FIG. 2, an engine part providing physical output except data transmission may be provided to the data processing apparatus 20. For example, in the case that the data processing apparatus 20 is a laser printer, this engine part will be a printer engine or a like. With the CPU 16 controlling these properly, the data processing apparatus 20 can perform a print function.

A hardware configuration of the information apparatus 10, like the configuration of the data processing apparatus 20 shown in FIG. 2, may include a CPU, a ROM, a RAM, a NVRAM and a communication interface. For example, a conventional computer can be applied.

As these hardware perform functions described with FIG. 1, while the data processing unit 21 and the data converting unit 22 in the data processing apparatus 20 conduct a predetermined data processing, the data processing apparatus 20 can identify a plurality of data formats and can output processed data ultimately processed by the data processing unit 21.

Additionally a socket can be used commonly for the case that the data processing unit 21 receives data from the information processing apparatus 10 and for the case that the data processing unit 21 receives data from the data converting unit 22. Therefore, if the data processing unit 21 (the software and hardware of data processing unit 21) is already developed, it is not necessary to modify the data processing unit 21. Furthermore, adding simply the software and hardware for performing functions of the data converting unit 22 allows the data processing apparatus 20 to function as described above.

Figure 3:
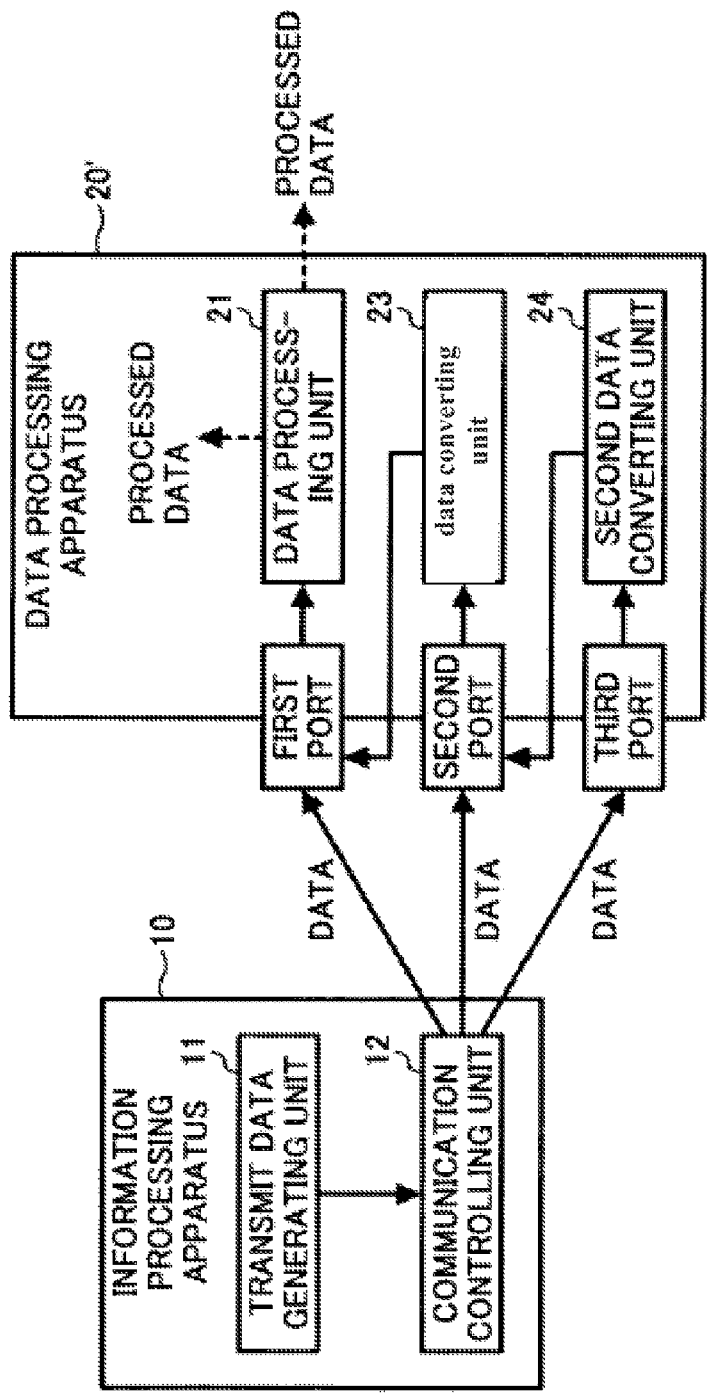
FIG. 3 is a functional block diagram showing an example of a modification of the system shown in FIG. 1.

In addition, as shown in FIG. 3, a similar effect can be obtained in the case that the data processing apparatus 20 is provided with multiple data converting units, each data converting unit converts data into the data format that can be processed in the next data converting unit and sends converted data to the port of the next converting unit by a loopback. That is, a similar effect can be obtained by sending converted data from the data converting unit to the port of the address corresponding to the next data converting unit, where the next data converting unit receives data. In this case, each data converting unit 23 or 24 corresponds to a data converting part. While FIG. 3 shows two data converting units, it should be understood that more data converting units may be provided.

In this case, if the information processing apparatus 10 selects according to a data format a port to which the information processing apparatus 10 sends data first, on the data processing apparatus 20 side, each data converting unit conducts a data converting process and identifies a plurality of data formats so that data ultimately processed by the data processing unit 21 can be output.

Further if a data converting unit sends data to the port corresponding to the next data converting unit (for example, the second port in FIG. 3), only converting processes of such data converting unit and next data converting unit can be conducted. In other words, it is possible to start from halfway in the convert process by selection of the port, when the information processing apparatus 10 sends data to the data processing apparatus 10.

Figure 4:
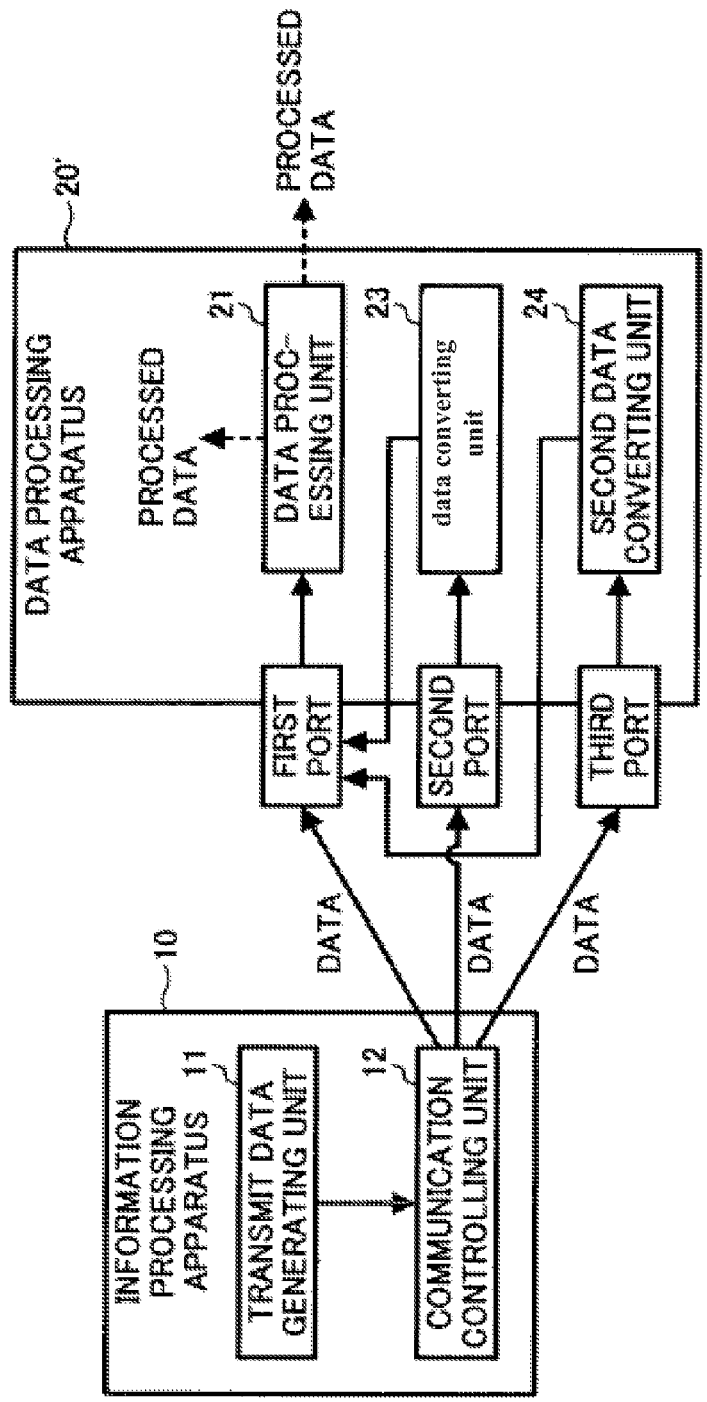
FIG. 4 is a function alblock diagram showing another example of a modification of the system shown in FIG. 1.

In addition, as shown in FIG. 4, it is possible that on the data processing apparatus side, a plurality of data converting units convert data into the format that can be processed by the data processing unit 21 and send converted data to the first port by a loopback. Further, in this case, each data converting unit conducts a data converting process and identifies a plurality of data formats so that data ultimately processed by the data processing unit 21 can be output.

A configuration such as shown in FIG. 3 may be applied in the case that data converting processes are required to be conducted as an embedded structure. On the other hand, a configuration such as shown in FIG. 4 may be applied in the case that one data converting process is enough to convert the data into the format that can be processed by the data processing unit 21, while a plurality of data formats are required to be processed. These configurations can, of course, be combined.

Second Embodiment: from FIG. 5 to FIG. 16

Figure 5:
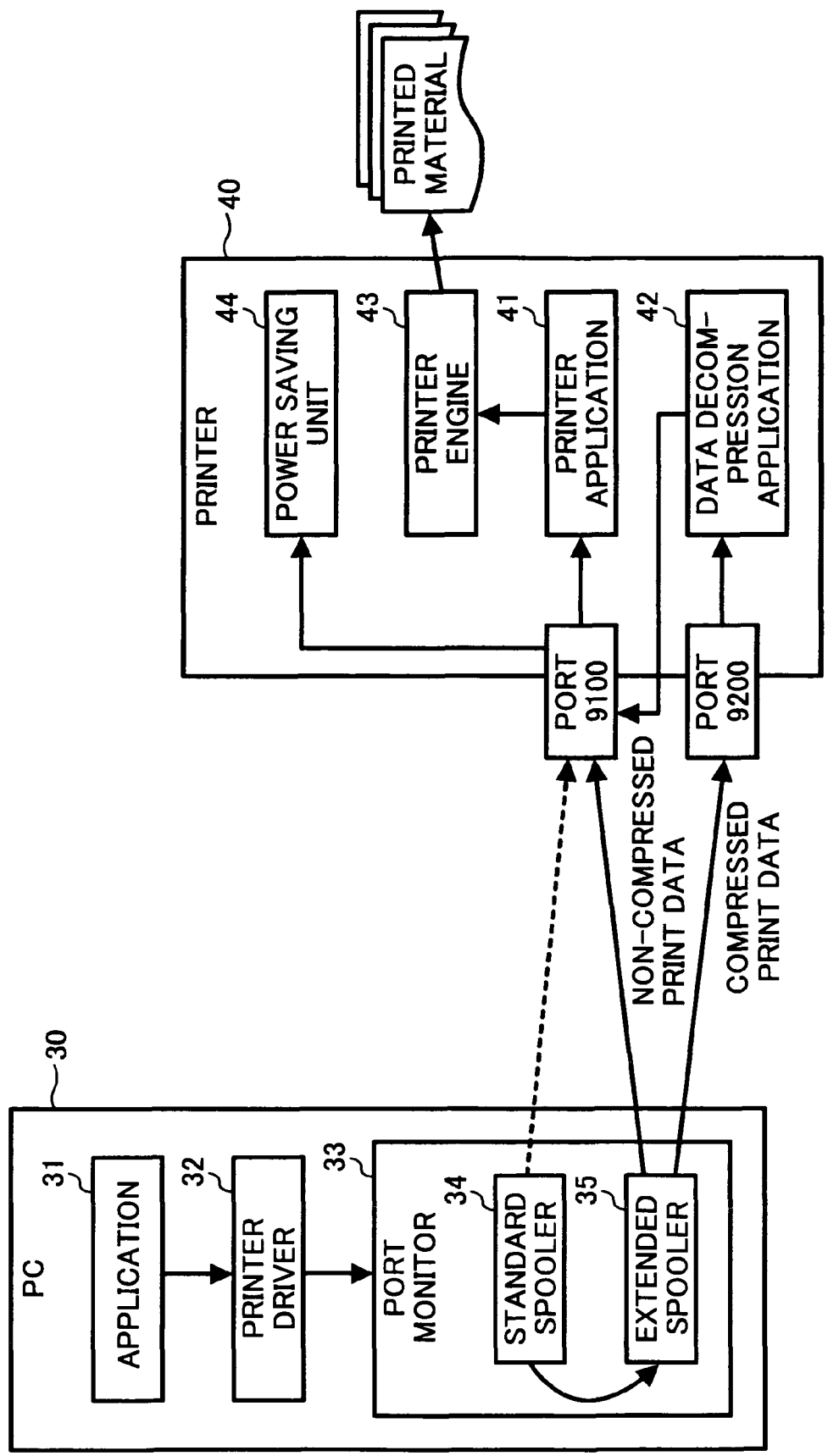
FIG. 5 is a functional block diagram showing a configuration of a print system according to a second embodiment.

Next, a second embodiment of a data converting system will be described. FIG. 5 is a block diagram showing a configuration of a print system in the second embodiment. In FIG. 5, each block in the diagram may correspond to functions implemented by software and to explain simply, processes or operations performed by the CPU 121 executing the software are sometimes referred to herein as the software performing these processes or operations.

As shown in FIG. 5, this print system includes a PC 30 and a printer 40 which correspond respectively to the information apparatus 10 and the data processing apparatus 20 in the first embodiment.

The printer 40 includes a printer application 41 as a data processing part and a data decompression application 42 as a data converting part.

The printer application 41 monitors the port 9100. When the printer application 41 receives data through port 9100, the printer application 41 identifies the received data as print data in the specific printer language and conducts a process that converts the print data into image data so that a printer engine 43 can print. In other words, the printer application 41 performs functions similar to the functions of the printer application 91 in printer 90 as explained in the background section in connection with FIG. 18.

The data decompression application 42 monitors port 9200. When the data decompression application 42 receives data through port 9200, the data decompression application 42 identifies the received data as compressed data in a specific format, decompresses the data and sends the decompressed data to the port 9100 by a loopback.

Accordingly, when the printer 40 receives compressed data in the port 9200 the printer 40 can also print the data after decompressing the data.

Additionally, the printer application 41 and the data decompression application 42 process data based on the assumption that the received data is in the specific required format. Therefore, if the format of the received data is different from the required format, meaningless data is output. However, in the case the data source sends data in an appropriate data format, the system can operate without a problem. Therefore, in the view of decreasing processing load, these configurations are applied.

Additionally, the data decompression application 42 may be a SDK (software development kit) server application with J2ME (JAVA 2 Micro Edition), which is JAVA for embedded devices.

Additionally, the printer 40 includes a power saving unit 44 and in the case the printer 40 does not receive any data or performs any print operations, the printer 40 turns is set into a power saving mode. In this mode, so as to save the power, the printer 40 turns off each part of the printer 40 and allows only some programs to remain in the RAM.

That is, in this case, the printer application 41 may remain in the RAM during the power saving mode because it is an essential application. On the other hand, the data decompression application 42 is deleted from the RAM because it is not used as the setting in the PC 30 may be. Therefore, in the power saving mode, the printer 40 does not process data received via the port 9200.

When the printer 40 receives data via the port 9100 to which print data is sent, or detects instruction via an operation unit (not shown in the diagram), the power saving unit 44 causes the printer to return to the normal operation mode and to read out programs deleted from the RAM so as to execute. In the normal operation mode, the printer 40 can conduct a decompression process to data received via the port 9200.

On the other hand, the PC 30 includes an application 31, a printer driver 32 and a port monitor 33. The application 31 and the printer driver 32 perform functions similar to the functions of the printer application 81 and the printer driver 82 in the printer 80 as explained in the background section in connection with FIG. 18.

The port monitor 33 includes a standard spooler 34 and an extended spooler 35. The standard spooler 34 performs the functions similar to the functions of the port monitor 83 in the printer 80 described above. In other words, the printer driver 32 is provided with a function that spools print data converted into a printer language in the spool directory of the standard spooler 34. And the standard spooler 34 is provided with a function that sends the data spooled in the spool directory to the port 9100 of the printer.

However, as described hereinafter, in the case the PC 30 sends print data to the printer in which the extended spooler 35 is set for use, the PC 30 does not use a function of the standard spooler 34. The data spooled in the spool directory of the standard spooler 34 is spooled again in the spool directory of the extended spooler 35. The extended spooler 35 sends the data to the predetermined port of the printer 40.

At this time, the extended spooler 35 compresses the print data according to user setting. The extended spooler 35 sends the data not compressed to the port 9100 as well as the standard spooler 34 and sends the compressed data to the port 9200. In this case, a format of the compression is a format that the data decompression application 42 in the printer 40 can decompress (for example, GZIP format).

The hardware configurations of the PC 30 and the printer 40 described above may be the same as the configurations in the first embodiment explained in connection with FIG. 2, except that the printer 40 includes a printer engine 43 as an engine part. Additionally, the printer 40 may be a multi-functional apparatus including a copier, a facsimile function and a like.

FIG. 6 is a diagram showing a data format that the PC 30 sends to the printer 40.

In the case that a PCL (printer control language) 6, a PCL 5e or a RPCS (refined printing command stream) format is used as a printer language, a header and a footer in the PJL (printer job language) format is attached to binary data of print data. The header and the footer include information on the execution of the printer job such as duplex printing or not. The extended spooler 35 compresses the whole data from the header to the footer and sends the compressed data to the port 9200 in the printer 40. Here, a GZIP format is used as a format of the compression. However, other formats may be applied if the data decompression application 42 can decompress data in the format.

On the other hand, on the printer 40 side, the data decompression application 42 decompresses the data into original print data and sends to the port 9100 by a loopback. That is, the data decompression application 42 sends the data to the port of the predetermined address for sending uncompressed data. The data sent to the port 9100 is data that a conventional printer can process and the printer application 41 conducts a print process based on this data.

Additionally, in the case the extended spooler 35 does not conduct a compression process, the extended spooler 35 sends the print data in the format shown on the right side of FIG. 6 to the port 9100 in the printer 40.

Next, diagrams from FIG. 7 to FIG. 11 are diagrams showing examples of screens for setting the extended spooler 35 in the PC 30. These screens provide a GUI (graphical user interface) in the display (not shown) of PC 30.

FIG. 7 is a diagram showing an example of a registered printer list screen that shows a list of printers registered as available printers.

This registered printer list screen 200 is a screen displayed by operation of functions of an OS (operating system) in the PC 30. In a printer name display area 201, names of available printers are displayed and in a status display area 201, statuses of the printer are displayed.

Here, a registered printer means a printer to which the OS through a printer driver 32 can send appropriate print data, by sending proper information to the printer driver 32, in a case that a print instruction is given, the OS identifying information such as a model of the printer, a driver to control the printer, destination of data and a like. Additionally, a name of a printer shown in the printer name display area 201 maybe the same as a model of the printer. However, a different name from or a name set by a user also may be applied.

In the registered printer list screen 200, it is possible to register a new printer by selecting "add printer" displayed on the top of the printer name display area 201.

FIG. 8 is a diagram showing an example of a port select screen displayed when a new printer is registered.

This port select screen 210 is a screen for selecting a port used for communicating with the new printer, and is displayed when a user selects "add printer" in the registered printer list screen 200. In a port list area 211, a list of available ports is displayed and it is possible to select a port by designating a port and clicking an OK button 212. If a cancel button 213 is clicked, the operation of adding a printer is canceled.

Moreover, in an example shown in FIG. 8, "local port" means a port that is used when the PC 30 communicates with a printer connected locally. "standard spooler" and "extended spooler" mean ports that are used when the PC 30 communicates with a printer using "standard spooler" and "extended spooler", respectively. Additionally, "extended spooler" is displayed only when the extended spooler 35 is registered for the OS as a device driver.

FIG. 9 is a diagram of an example of the screen for setting the usage of the extended spooler 35 and for setting compression of the print data when a user instructs a printer to print.

This setting screen 220 is shown by operation of a function of the extended spooler 35 when a user selects the usage of the extended spooler 35 in the port select screen 210.

In this screen, a user selects a protocol to transmit print data during printing in a protocol select area 221, and clicks a search button 222 and the PC 30 broadcasts by means of a function of the OS so as to search available printers. The printers are shown in a printer list area 223. In an example of this diagram, models, IDs and IP (internet protocol) addresses of printers are shown in this area. However, it is not limited to such printer information.

A user can point a cursor 224 to a printer in the list and select a printer from the printer list area 223. When a user clicks an OK button 226, a port is created, which is used when the PC 30 instructs the selected printer to print. At the same time, the extended spooler 35 is set to use in instructing the printer to print and the IP address in sending data to the printer is set. Moreover, if a check box 225 is checked at this time, compression of print data to be sent to the port 9200 is set. Additionally, if the cancel button 227 is clicked, this screen is closed without setting.

FIG. 10 is a diagram showing an example of a registered printer list screen in which a printer displayed at the point of the cursor 224 in FIG. 9 is added from a state shown in FIG. 7.

In this screen, a name and a status of the added printer is shown at the point 203. In this example, "Printer_A" is already registered, and therefore in order to distinguish from this, a name of the new registered printer includes "No. 2" and "(compressed)" besides a model name. This name can be generated automatically, although, of course, is not limited to this.

FIG. 8 is an example of a screen shown in a case that a user chooses, in the registered printer list screen 200, to refer to the setting of the port of the printer set to use the extended spooler 35 in the setting screen 220 described above.

In the screen 230 (shown in FIG. 11), indication of a setting to use the extended spooler is shown in a title bar 231 and indication of a setting on which port to send data in sending data to be printed is shown in a port number area 232. An indication of a setting of whether to compress print data or not is shown in a check box 233.

In the example of FIG. 11, a destination port is set to the port 9200 because print data is compressed. However, this setting can be changed according to the setting of the printer. Additionally, when print data are set not to be compressed, the destination port may be changed automatically.

Figure 12:
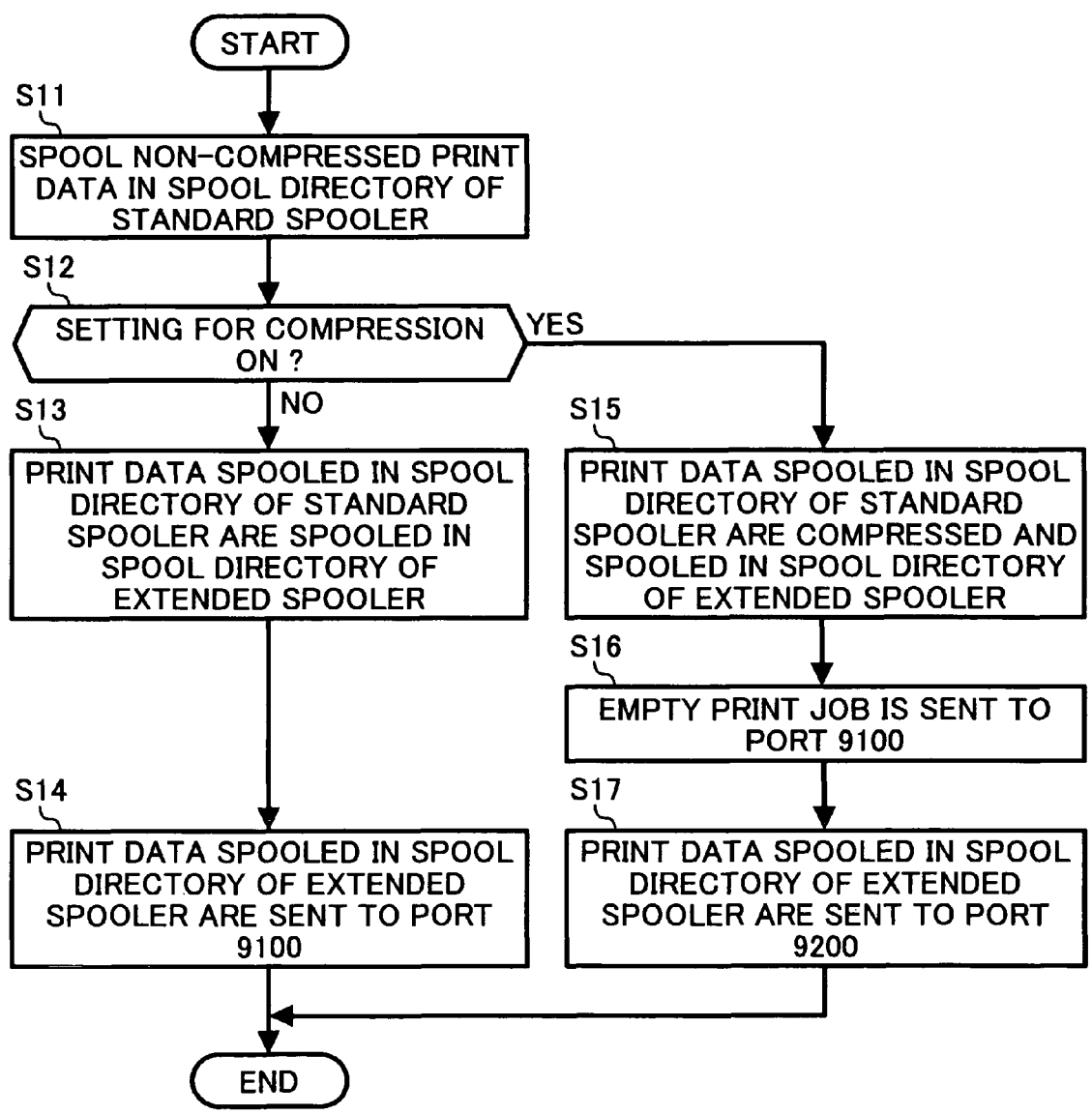
FIG. 12 is a flowchart showing a process conducted on the PC side in the system shown in FIG. 5.

Next, FIG. 12 is a flowchart showing a process that can be conducted on the PC 30 side in the print system shown in FIG. 5.

The CPU can conduct this process by executing the printer driver 32 and the extended spooler 35 in a case that a print instruction to the printer that is set to use the extended spooler 35 is detected in the PC 30.

In step S11, the printer driver 32 spools print data that are not compressed in the spool directory of the standard spooler 34.

Then in step S12, it is determined whether or not the setting to compress print data on this printer is on.

If the setting to compress print data is not on, the process advances to step S13 and the print data spooled in the spool directory of the standard spooler 34 are spooled in the spool directory of the extended spooler 35, without compression. Then in step S14, the print data are sent to the port 9100 of the address of the printer 40 and the process ends. Additionally, print data having predetermined data size (such as 4096 bytes) may be sent.

On the other hand, if in step S12 the setting to compress print data is on, the process advances to step S15 and the print data spooled in the spool directory of the standard spooler 34 are compressed and spooled in the spool directory of the extended spooler 35. Then in step S16, an empty print job is sent to the port 9100 of the address of the printer 40, which resets the printer 40 to the normal operation mode if it is in the power saving mode. This is because if the printer 40 remains in the power saving mode, it cannot process print data sent to the port 9200. Additionally, data sent in this instance, as an empty printer job, may be print data that is dummy data that consist of, for example, only a header and a footer shown on the right side of FIG. 6. Moreover, it is not necessary to compress this data.

Next, in step S17, print data spooled in step S15 are sent to the port 9200 of the printer 40 and a process ends. Print data having the predetermined data size such as 4096 bytes also may be sent to the port 9200. Additionally, if it is set to send data to another port in the screen shown in FIG. 8, instead of the port 9200, print data is sent to that other port.

Due to the process described above, if print data are sent in a data format that the printer application 41 can process, the print data are sent to the port that is monitored by the printer application 41. If print data are sent in a data format that the printer application 41 cannot process, the print data are sent to the other port that is monitored by another application which can convert the print data into the data format that the printer application 41 can process.

Accordingly, the printer 40 side can process both data formats appropriately.

Figure 13:
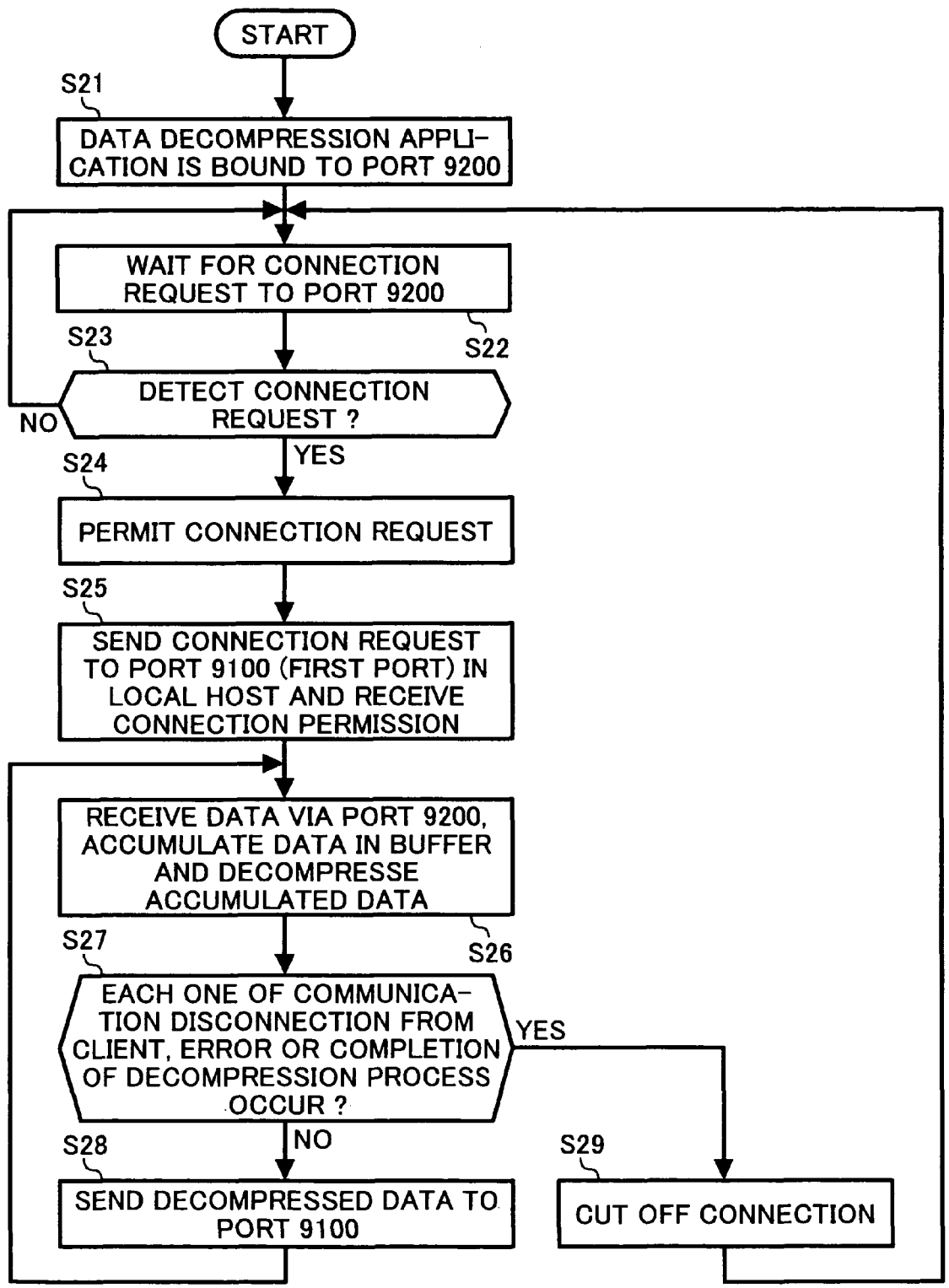
FIG. 13 is a flowchart showing a process conducted by a data decompression application on the printer side in the system shown in FIG. 5.

Next, FIG. 13 is a flowchart showing a process conducted on the printer 40 side by the CPU executing data decompression application 42 in the print system shown in FIG. 5.

The CPU starts the process shown in FIG. 13 when the printer 40 is activated or reset from the power saving mode to the normal operation mode.

In step S21, the data decompression application 42 is assigned to the port 9200 and monitors this port. That is, the decompression application 42 enters the state of monitoring data reception via the port 9200. In step S22 and S23, the data decompression application 42 waits for a connection request to the port 9200.

If the data decompression application 42 detects the connection request from external clients such as a PC 30 or a local loopback, the process advances from step S23 to S24. In step S24, the connection request is permitted and in step S25 the data decompression application 42 sends a connection request to the port 9100 as a local host in order to receive connection permission.

In step S26, the data decompression application 42 receives data via the port 9200, accumulates the data in a buffer and decompresses the accumulated data. This decompression process may be conducted, without referring to the data format of the data received, with an assumption that the data is in a specific data format, such as a GZIP format and utilizing libraries of J2ME for a decompression process. For example, the process may wrap an input stream of a socket with GZIPInputStream in a library of J2ME in order to process data in the GZIP format.

In step S27, it is determined in step S26 whether an event of a communication disconnection from a client, an error or a completion of the decompression process occurs in step S26. Here, the error in the decompression process may, for example, be a case that a library that is used for decompression indicates an error has occurred as a result of the decompression process. On the other hand, in some cases, some sort of result may be obtained even if wrong data are input, and therefore an error does not occur.

If none of the events occur in step S27, the process advances to step S28, and the decompressed data are sent to the port 9100. The decompressed data may be sent regardless of the number of blocs of data in the predetermined data size such as 4096 bytes. For example, in the case GZIPInputStream described above is used, data in the predetermined data size may be obtained from the library and directly sent to the port 9100. Additionally, the data size of the data sent once may be the same size as the size of the data the PC 30 sends directly to the port 9100.

After step S28, the process returns to step S26 and repeats the sequence of steps until step S27 is YES.

If step S27 is YES, the process advances to step S29. In step S29, the connection is cut off and then the process returns to step S22.

Due to the process described above, the printer 40 can decompress the data received via the port 9200 so as to convert the data into the data format that the printer application 41 can process and send the decompressed data to the port 9100. This decompression process is the same regardless of the data format of the received data. However, if the received data are in an appropriate format, the output is print data in the format that the printer application 41 can process.

Figure 14:
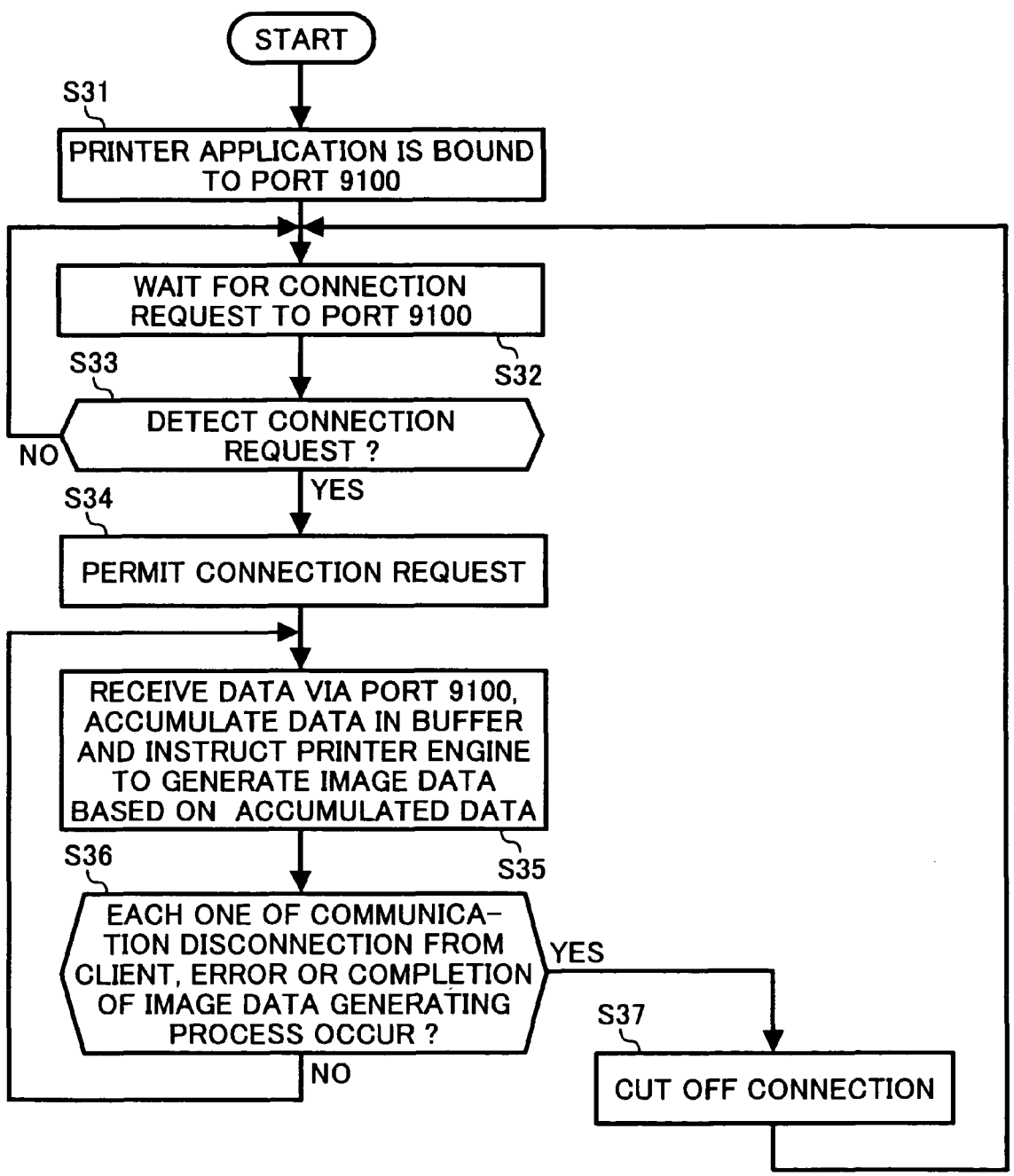
FIG. 14 is a flowchart showing a process conducted by a printer application on the printer side also in the system shown in FIG. 5.

Next, FIG. 14 is a flowchart showing a process conducted on the printer 40 side by the CPU executing the printer application 41 in the print system shown in FIG. 5.

The CPU starts the process shown in the flowchart of FIG. 11 when the printer 40 is activated.

In step S31, the printer application 41 is bound to the port 9100 and monitors this port. That is, the printer application 41 enters the state of monitoring data reception via the port 9100. In step S32 and S33, the printer application 41 waits for a connection request to the port 9100.

If the printer application 41 detects a connection request from external clients such as a PC 30 or a local loopback, the process advances from step S33. to step S34. In step S34, the connection request is granted. For example, the connection request that is sent from the data decompression application 42 in step S25 in FIG. 13 is detected here and permission to connect is granted.

In step S35, the printer application 41 receives data via the port 9100, accumulates the data in a buffer and instructs the printer engine 43 to generate image data based on the accumulated data. In the case that the connection request granted in step S34 was sent from the data decompression application 42, data received here are the data sent from the data decompression application 42 in step S28 of FIG. 13.

In step S36, it is determined whether an event of communication disconnection by a client, an error, or a completion of the image data generating process has occurred. If it is determined that such an event has not occurred (step S36, No) the process returns to step S35 and repeats until an event of communication disconnection from a client, an error or a completion of the image data generating process in step S35 occurs. If one of these events occurs (step S36, YES), the process returns to step S32 and repeats the sequence of steps.

Due to the process described above, the printer 40 can conduct the specific image data generating process that converts data received via the port 9100 into image data that drives the printer engine 43 and cause the printer engine 43 to print. This process is the same for the case that the data source is the PC 30 and for the case that the data source is the data decompression application 42. Additionally, the image data generating process is the same regardless of the data format of the received data. If the received data is in an appropriate format, the image data showing the image to be print is obtained.

Moreover, the process in this flowchart may be the same as the printer engine in a conventional printer.

In the print system described above, in which functions described above are provided in a PC and a printer, even if the printer application in the printer 40 can only interpret print data in a specific format, the printer 40 can print when compressed data are received from the PC 30.

Additionally, a socket is shared for the case that the printer application 41 receives data from the PC 30 and for the case that the printer application 41 receives data from the data decompression application 42. Therefore, if the printer application 41 is already developed, it is not necessary to modify the printer application 41. Furthermore, adding the data decompression application 42 can allow the printer 40 to function as described above. Moreover, on the PC 30 side, the functions described above can be obtained, without modifying the configuration, only with the installation of the extended spooler 35 and the setting to compress the data with the extended spooler 35 in instructing the printer 40 to print.

Accordingly, with use of existing resource, it is possible to develop the print system that realizes the high speed printing by transmitting compressed print data with low development cost. Moreover, the printer 40 side conducts the specific process to the data received via the specific port, and therefore development cost can be reduced and in addition processing load can be reduced in the printer wherein hardware resource are generally restricted tightly.

Furthermore, if the printer switches the data converting process according to the data format of the received data, the data must indicate the data format, for example, in a header. The part indicating the data format cannot be compressed. On the other hand, if the printer always conducts the same converting process, it is not necessary to indicate the data format, and therefore all of the data can be compressed so that a high compression rate can be obtained.

FIG. 15A-15C and FIG. 16 are diagrams showing the results of comparison of the actual time required to send compressed print data and to print on the one hand with on the other hand the actual time required to send uncompressed print data and print in the print system described above.

The system environment and print data used to obtain these results are discussed below.

As the PC 30, a PC including a PENTIUM M 1.2 GHz processor as a CPU, 512 MB RAM and about 33 GB HDD, WINDOWS XP PROFESSIONAL SP1 as an OS and, OFFICE 2000 by MICROSOFT CORPORATION as an application to print were used.

AFICIO 2022, a multi-functional apparatus by RICOH COMPANY, LTD was used as the printer 40.

The connection between the PC 30 and the printer 40 was configured with a line emulator to transmit at speeds of 64 k (kilo bit per second), 128 k, 448 k and 1344 k. As routers to connect with the line emulator, AE1001006, part#11375 by BAYNETWORKS on the PC 30 side and AE1001005, part#11375 RevJ on the printer 40 side were used.

Additionally, applications on the printer 40 side were developed with the DSDK version 1.10 Server and SDK GZIP Application version 1.02.

As printer languages, PCL6 version 1.2.0.0, RCL5e version 1.2.0.0 and RPCS version 4.19 were used and corresponding printer drivers were used on the PC 30 side.

As print data, J9.doc (J9), J10.xls (J10) and J11.ppt (J11) were used, which are standard patterns of MICROSOFT WORD, EXCEL and POWERPOINT, respectively, standardized by JEITA (Japan Electronics and Information Technology Industries Association) .As for J9, all the five pages were printed. As for J10, all the five pages were printed by the operation that is from "file" to "print" to "all the book" to "OK" from the menu. A3 size data were printed as A3 size. As for J11, all the twelve pages were printed.

As for the print time, the time required from the click of a print start button of the application to each of the data in, the first print (the first page is completely ejected) and the completion of the print was measured. Additionally, print settings were the default values in each instance.

As shown in FIG. 15A-15C, the times required for data in, first page print and completion of print are shown as minutes are on the left side of ":" and on the right side are seconds to the second decimal place. In addition, the ratios of the time required to process compressed data to the time required to process not compressed data are shown as percentages.

FIG. 16 is a diagram showing a result of the compression rate of each data to be printed.

As for the data size of each data, for spooled data, the size in the screen of the printer driver was used. As for not compressed data, the size of the data spooled in C:¥Windows¥system32¥spool¥PRINTERS was used with queue offline. As for compressed data, the size of the compressed data spooled in C:Windows¥NAVITEMP was used.

The measure of the data size is MB (Mega Bytes) for spooled data, and KB (Kilo Bytes) for not compressed data and compressed data. The numbers in the document type section are the data size of the file to be printed and the measure of the data size is KB. "3P" and "2P" in the section "J10" are each number of pages to be printed in two work sheets included in the book of J10.

Referring to the data described above, it turns out that the size of print data decreased to up to 70%, in some printer languages, decreased to up to 50%.

In addition, at least at the speed up to 448 k, in any conditions, the time required to the completion of the print decreased significantly due to the compression of print data. It is believed that the time required for transmitting print data decreased due to reduction of data size by compressing the data.

Accordingly, the configuration in the embodiment described above is effective for reducing print time.

Additionally, in a case that the transmission speed is at the higher rate of 1344 k, the time required to complete the print operation was not reduced significantly. The large size data can be transmitted quickly if the transmission speed is high. However, the time required to compress the data rather than the time to transmit the data is a problem in this instance.

On the other hand, the print time can be reduced in the case that the transmission speed is not so high (for example, 448 k), and therefore, in the environment like this, the data at high transmission speed can be disregarded.

Modification of Second Embodiment: FIG. 17 to FIG. 20

Next, a modification of the second embodiment explained above will be described.

In the second embodiment, the process conducted to the data received via the port 9200 is decompression of compressed data. However it is not limited to this. As examples of other processes, a decryption process may be applied to encrypted data, a printer language converting process can be applied to convert print data in other printer languages into print data in a predetermined printer language that the printer application 41 can process and/or a process that may be conducted by printer driver 32 to convert data output by the application 31 in the PC 30 into data in the printer language.

Some of these examples are shown in FIG. 17 and FIG. 18.

For example, it is possible to improve security in transmitting print data if the PC 30 encrypts print data in the print language and sends the encrypted data to the port 9200 in the printer 40 and the printer 40 decrypts print data and sends the decrypted data to the port 9100 so as to print.

As another example (FIG. 18), it is possible to print data by the printer 40 without the printer driver 32 on the PC 30 side if data of a ledger sheet defined with a XML format are directly sent to the port 9200 in the printer 40 and the printer 40 converts the data into the printer language that can be processed by the printer engine of the printer 40 and sends converted data to the port 9100. Accordingly, installation of a printer driver for each client is not needed and management cost can be reduced.

Moreover, for portable terminals such as a PDA (personal digital assistant) or a cell phone, it is cumbersome to install an updated printer driver repeatedly and the ability of a processor is thought to be relatively low. Therefore, it is effective to provide the printer 40 side with the function of the printer driver.

Figure 19:
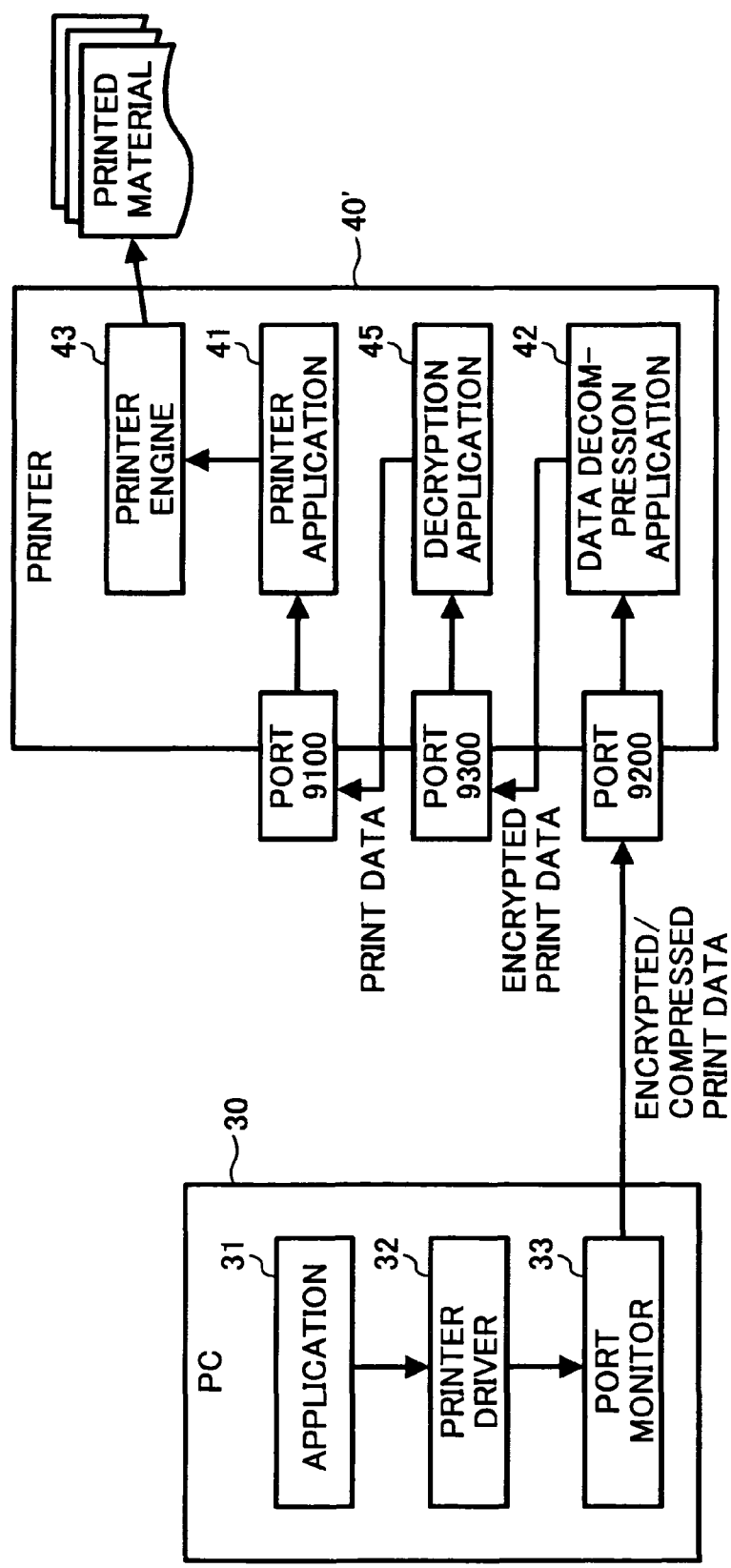
FIG. 19 is a functional block diagram corresponding to FIG. 5, showing a configuration of another modification of the second embodiment.

Additionally, as an example of the first embodiment discussed in connection with FIG. 3, a configuration wherein multiple data converting units generate print data in a printer language that can be processed by the printer application 41 and can be sent to the port 9100 may be adopted. FIG. 19 is a function block diagram showing an example of such a configuration.

In this example, the printer 40' is provided with an encryption application 45 as an adaptation of the configuration of the printer 40 shown in FIG. 5. Therefore, the printer 40' can print based on print data received via the port 9300 by conducting one or more decryption processes and can send the result to the port 9100. Additionally, a data decompression application 42 sends a result of a decompression process to the port 9300.

Print data, encrypted and compressed on PC 30 side, are sent to the port 9200 in the printer 40 and, on the printer 40' side, the print data undergo a decompression process and a decryption process so as to be printed.

Further, in this case, each application conducts a specific process to data regardless of the data format. Functions of the printer 40' can be realized by adding a data decompression application 42 and a decryption application 45 to a printer application 41 provided with the same functions as a conventional printer application.

Figure 20:
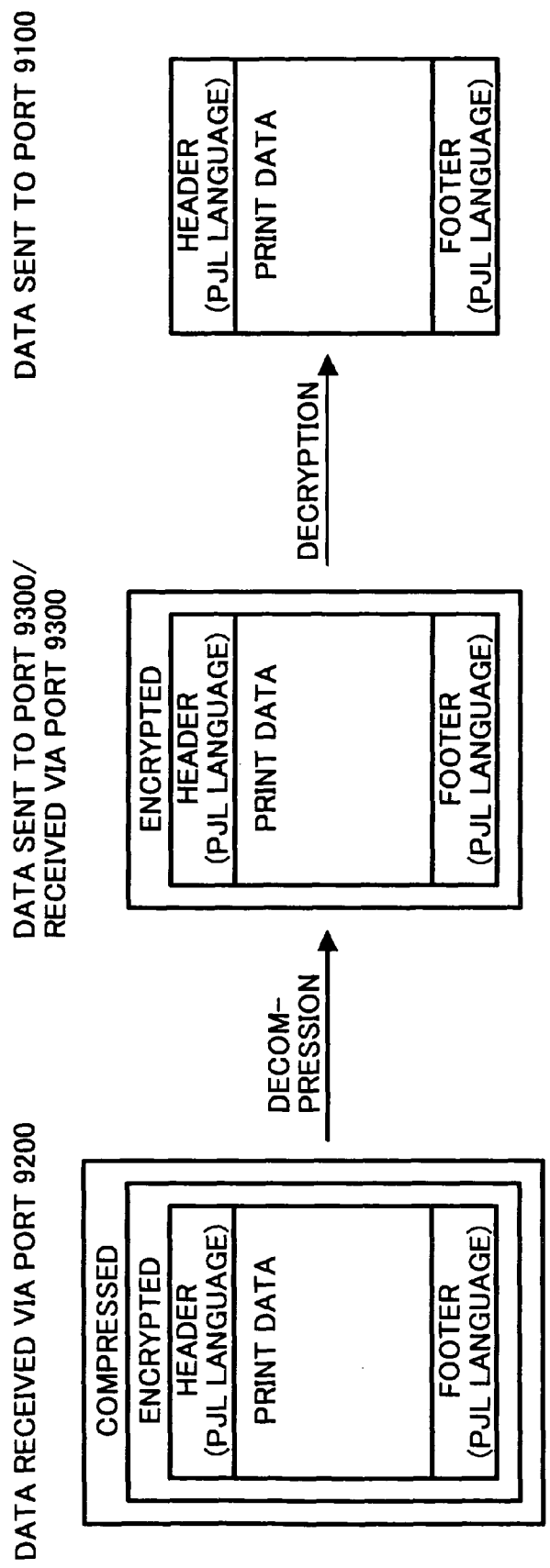
FIG. 20 is a diagram showing an example of a format of data in another modification of the second embodiment.
Figure 21:
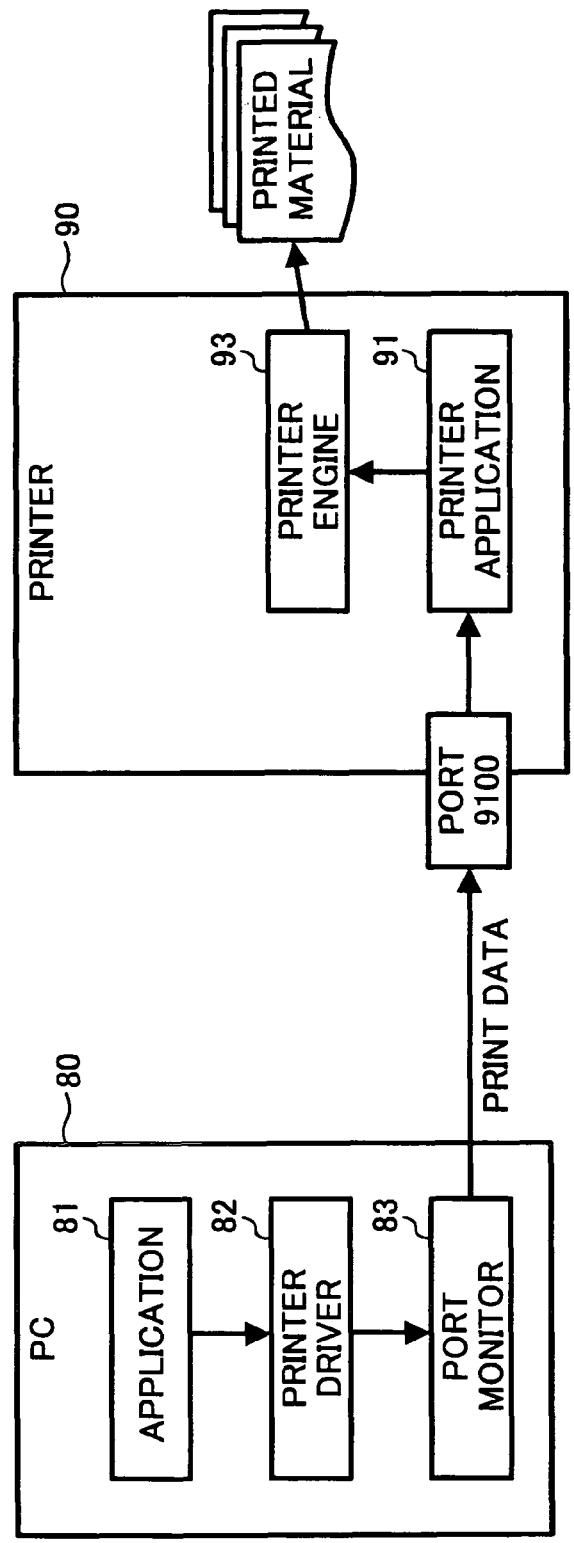
FIG. 21 is a functional block diagram showing a configuration of a printer as an example of a well known data processing apparatus with a configuration of a PC that instructs the printer to print.

FIG. 20 is a diagram showing a data flow in such a configuration of the printer 40.

In this case, print data sent from the PC 30 to the printer 40' are encrypted and furthermore compressed. On the printer 40' side, the received data undergo a decompression process by a decompression application 42 and print data uncompressed but encrypted are sent to the port 9300 of the printer 40'.

A decryption process is applied by a decryption application 45 to the print data so as to convert the data to a printer language that can be processed by the printer application 41. The print data are sent to the port 9100 in the printer 40' and the printer application 41 generates image data to be printed by the printer engine 43 based on the received print data.

The present disclosure is not limited to the specifically disclosed embodiments and modifications discussed above, and variations and modifications may be made without departing from the scope of this disclosure and the appended claims. For example, devices, a system configuration, concrete processes, communication protocols and a like are not limited to the specifically disclosed embodiments and modifications.

For example, as a communication line, other than network, a communication line using a parallel cable may be applied.

Additionally, a function that identifies an error and stops printing when it identifies invalid data (for example, data in an impossible data format for valid data are included) may be provided to the printer application 41. This will minimize wasteful printing wastefully based on wrong data.

Moreover, this disclosure can be applied to any data processing apparatus other than an image forming apparatus such as a printer. As some examples, business systems such as a ledger system, a ticketing system and a like, and a recording apparatus and an output apparatus such as a television, a video recorder, a radio and a like may be adapted in accordance with the techniques discussed in this disclosure.

Moreover, a program according to the present disclosure may be a program for causing a computer to function as the data processing apparatus 20 described above. The program is executed by the computer and the above-described effects can be obtained.

This program may be stored beforehand in a storing part such as a ROM, an HDD, and a like, mounted to the computer. Alternatively, the program may be recorded in a non-volatile recording medium (memory) such as a CD-ROM, a flexible disk, an SRAM, an EEROM, a memory card, and a like, to provide the program to the computer. By causing the computer to read out the program from the memory and execute the program, each of steps described above in the embodiments can be conducted.

Furthermore, by connecting to a network and downloading the program from an external device mounting the recording medium recording the program or an external device recording the program in a recording part, each of steps described above in the embodiments can be conducted.

The above discussed embodiments and examples are illustrative, and many variations can be introduces on these embodiments and examples without departing from the spirit of the disclosure or from the scope of the appended claims. For example, elements and/or features of different illustrative embodiments may be combined with each other and/or substituted for each other within the scope of this disclosure and appended claims.

The present application is based on the Japanese Priority Applications No. 2005-105315 filed on Mar. 31, 2005 and No. 2005-324296 filed on Nov. 9, 2005, the entire contents of which are hereby incorporated by reference.

What is claimed is:

1. A data processing apparatus comprising:
   a data processing part for monitoring a first port of the data processing apparatus and processing first data received via the first port regardless of a data format of the first data;
   a data converting part for monitoring a second port of the data processing apparatus, said second port being different from said first port, performing predetermined processing on second data received via said second port, regardless of a data format of the second data, so as to automatically convert all of said second data received via said second port into a predetermined first data format which can be processed by said data processing part and automatically sending all of the converted data directly to said first port of said data processing apparatus to have the converted data processed by said data processing part of the data processing apparatus.

2. The apparatus as claimed in claim 1, wherein said first data indicates that the first data is to be sent to said first port, and said second data indicates that the second data is to be sent to said second port.

3. The data processing apparatus as claimed in claim 1, wherein said data converting part comprises
   a plurality of converting parts for monitoring each specific port that is different from said first port, each converting part conducting a plurality of specific processes to data received via the specific port regardless of a data format of the received data so as to automatically convert all of said received data received by the specific port into the predetermined first data format that can be processed by said data processing part and automatically sending all of the converted data directly to said first port.

4. The data processing apparatus as claimed in claim 1, further comprising:
   a transiting part for setting the data processing apparatus into a power saving mode;
   a recovering part for resetting the data processing apparatus from the power saving mode to a normal operation mode when receiving data via said first port.

5. The data processing apparatus as claimed in claim 1, wherein said processing by the data processing part includes converting data in a printer language to image data to be printed by a printer engine.

6. The data processing apparatus as claimed in claim 1, wherein said predetermined processing performed by the data converting part is one of data decompression, decryption and printer language conversion.

7. A data processing system comprising:
   a data processing apparatus configured to process data received from an information processing apparatus, said data processing apparatus comprising:
   a data processing part for monitoring a first port of the data processing apparatus and conducting a first specific process to first data received via the first port regardless of a data format of the received data; and
   a data converting part for monitoring a second port of said data processing apparatus, said second port being different from said first port, conducting a second specific predetermined process to second data received via said second port regardless of a data format of the second data so as to automatically convert all of said second data received via said second port into a predetermined data format that can be processed by said data processing part, and automatically sending all of the converted data directly to said first port of said data processing apparatus to have the converted data processed by said data processing part of said data processing apparatus; and an information processing apparatus comprising a sending part for sending data in the predetermined data format that can be processed by said data processing part to said first port and sending data in a format that cannot be processed by said data processing part to said second port.

8. The data processing system as claimed in claim 7, wherein said data processing apparatus further comprises a transiting part for setting the data processing apparatus into a power saving mode;

a recovering part for resetting the data processing apparatus from the power saving mode to a normal operation mode when data is received via said first port, and wherein said information processing apparatus, further comprises a sending dummy data part for sending dummy data to said first port before sending data to said second port in a case of sending data to said second port.

9. The data processing system as claimed in claim 7, wherein the first specific process conducted by the data processing part includes converting from data in a printer language to image data to be printed by a printer engine.

10. The data processing system as claimed in claim 7, wherein the second specific predetermined process conducted by the data converting part includes one of data decompression, decryption or printer language converting.

11. A method for controlling a data processing apparatus, said method comprising the steps of:

a data processing step including monitoring a first port of said data processing apparatus, and conducting, by a data processing part of the data processing apparatus, a first specific process to first data received via the first port regardless of a data format of the first data, and a data converting step including monitoring a second port of said data processing apparatus, said second port being different from said first port, conducting a second specific predetermined process to second data received via said second port regardless of a data format of the second data so as to automatically convert all of said second data received via said second port into a predetermined data format that can be processed by said data processing part of said data processing apparatus, and automatically sending all of the converted data directly to said first port of said data processing apparatus to have the converted data processed by said data processing part of said data processing apparatus.

12. The method as claimed in claim 11, wherein said first data indicates that the first data is to be sent to said first port, and said second data indicates that the second data is to be sent to said second port.

13. The method as claimed in claim 11, further comprising: monitoring each specific port that is different from said first port; conducting a plurality of specific processes to data received via the specific port regardless of a data format of the data so as to automatically convert all of said data received via the specific port into the predetermined data format that can be processed by said data processing step; and automatically sending all of the converted data directly to said first port.

14. The method as claimed in claim 11, further comprising: setting the data processing apparatus into a power saving mode; and resetting the data processing apparatus from the power saving mode to a normal operation mode when receiving data via said first port.

15. The method as claimed in claim 11, further comprising: converting data in a printer language to image data to be printed by a printer engine.

16. The method as claimed in claim 11, wherein the second specific predetermined process conducted in the data converting step includes one of data decompression, decryption or printer language converting.

17. A method for adding a data converting function to a data processing apparatus including a data processing function to monitor a first port of said data processing apparatus and to conduct a first specific process to first data received via the first port regardless of a data format of the first data, said method comprising the steps of:

adding a data converting function for monitoring a second port of said data processing apparatus, said second port being different from said first port;

conducting, by the data converting function, a second specific predetermined process to second data received via said second port regardless of a data format of the second data so as to automatically convert all of said second data received via said second port into a predetermined data format that can be processed by said data processing function and automatically sending all of the converted data directly to said first port of said data processing apparatus to have the converted data processed by said data processing function of said data processing apparatus.

18. The method as claimed in claim 17, wherein said data converting function comprises:

a plurality of converting parts for monitoring each specific port that is different from said first port, each converting part conducting a plurality of specific processes to data received via the specific port regardless of a data format of the data so as to automatically convert all of said data received via the specific port into the predetermined data format that can be processed by said data processing function and, automatically sending all of the converted data directly to said first port.

19. The method as claimed in claim 17, wherein the second specific predetermined process conducted by the data converting function includes one of data decompression, decryption or printer language converting.

20. A program product including a non-transitory computer readable medium tangibly embodying a program of instructions executed by a computer to control a data processing apparatus, said program product including the non-transitory computer readable medium comprising:

data processing code for:

monitoring a first port of the data processing apparatus, and conducting a first specific process to first data received via the first port regardless of a data format of the first data, and data converting code for:
monitoring a second port of said data processing apparatus, said second port being different from said first port,
conducting a second specific predetermined process to second data received via said second port regardless of a data format of the second data so as to automatically convert all of said second data received via said second port into a predetermined data format that can be processed by said data processing code, and
automatically sending all of the converted data directly to said first port of said data processing apparatus to have the converted data processed by said data processing code of said data processing apparatus.

21. The data processing apparatus as claimed in claim 1, wherein the data processing part processes print data of the predetermined first data format to generate image data, and
wherein the second data received via said second port is print data of a second data format and the data converting part converts the print data into the predetermined first data format and sends the converted data to said first port of said data processing apparatus to have the converted print data processed by said data processing part to generate the image data.

22. The data processing apparatus as claimed in claim 1, further comprising a print engine,
wherein the data processing part processes print data of the predetermined first data format to generate image data, and the print engine prints an image based on the image data generated by the data processing part.

23. The data processing apparatus as claimed in claim 1, wherein all of said second data received via said second port is automatically converted into the predetermined first data format and automatically transmitted directly to the first port, regardless of any header information or footer information included in said second data.

24. The data processing apparatus as claimed in claim 1, wherein the data converting part automatically attempts to convert all of said second data received via said second port into the predetermined first data format and transmit the converted data directly to the first port, regardless of a content of said second data.

25. The data processing apparatus as claimed in claim 1, further comprising:
a second data converting part for
monitoring a third port of the data processing apparatus, said third port being different from said first port and said second port,
processing third data received via said third port, regardless of a third data format of the third data, so as to automatically convert all of said third data received via said third port into a predetermined second data format which can be processed by said data converting part and
automatically sending all of the converted third data directly to said second port of said data processing apparatus to have the converted data processed by said second data converting part of the data processing apparatus.

26. The data processing apparatus as claimed in claim 1, further comprising:
a second data converting part for
monitoring a third port of the data processing apparatus, said third port being different from said first port and said second port,
processing all third data received via said third port, regardless of a third data format of the third data, so as to automatically convert said all third data received via said third port into the predetermined first data format which can be processed by said data processing part and
automatically sending all of the converted third data directly to said first port of said data processing apparatus to have the converted data processed by said data processing part of the data processing apparatus.

27. The data processing apparatus as claimed in claim 1, wherein all of said second data received via said second port is compressed data including compressed header information, compressed footer information and compressed job data, and
the data converting part automatically converts the compressed data received via said second port into non-compressed data which can be processed by said data processing part, and automatically sends all of the converted data directly to said first port of said data processing apparatus to have the converted data processed by said data processing part of the data processing apparatus.

28. The data processing apparatus as claimed in claim 1, wherein all of said second data received via said second port is encrypted data, and
the data converting part automatically converts the encrypted data received via said second port into decrypted data which can be processed by said data processing part, and automatically sends all of the converted data directly to said first port of said data processing apparatus to have the converted data processed by said data processing part of the data processing apparatus.

29. The data processing apparatus as claimed in claim 1, wherein all of said second data received via said second port is printer-independent data, and
the data converting part automatically converts the printer-independent data received via said second port into a predetermined printer language which can be processed by said data processing part, and automatically sends all of the converted data directly to said first port of said data processing apparatus, to have the converted data processed by said data processing part in order to generate image data to be printed by a printer engine.

30. The system as claimed in claim 7, wherein the information processing apparatus determines a data format of job data, and
the information processing apparatus automatically transmits the job data to the first port of the data processing apparatus, if it is determined that the job data is in a non-compressed format, and
the information processing apparatus automatically transmits the job data to the second port of the data processing apparatus, if it is determined that the job data is in a compressed format.

* * * * *